(12) United States Patent
Curtis (10) Patent No.: US 8,135,849 B2
(45) Date of Patent: Mar. 13, 2012

(54) SERVER FOR AUTHENTICATING CLIENTS USING FILE SYSTEM PERMISSIONS

(75) Inventor: James R Curtis, Placerville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 11/831,756

(22) Filed: Jul. 31, 2007

(65) Prior Publication Data

US 2009/0037593 A1    Feb. 5, 2009

(51) Int. Cl.
G06F 15/16    (2006.01)

(52) U.S. Cl. .......................... 709/228; 709/229; 726/21

(58) Field of Classification Search .................. 709/229, 709/228; 726/4, 21, 22
See application file for complete search history.

(56) References Cited

U.S. PATENT DOCUMENTS

| | | | |
|---|---|---|---|
| 6,058,426 A * | 5/2000 | Godwin et al. | ............... 709/229 |
| 6,105,131 A | 8/2000 | Carroll | |
| 6,484,174 B1 * | 11/2002 | Wall et al. | ............. 1/1 |
| 6,742,094 B2 * | 5/2004 | Igari | ............. 711/163 |
| 7,376,955 B1 * | 5/2008 | Forman | ............. 719/310 |
| 2002/0184362 A1 * | 12/2002 | Banerjee et al. | ............. 709/229 |
| 2003/0033344 A1 * | 2/2003 | Abbott et al. | ............. 709/1 |
| 2004/0225893 A1 * | 11/2004 | Ng | ............. 713/200 |
| 2004/0250127 A1 * | 12/2004 | Scoredos et al. | ............. 713/201 |
| 2005/0120223 A1 | 6/2005 | Kiwimagi et al. | |
| 2005/0120240 A1 | 6/2005 | Kiwimagi et al. | |
| 2005/0204147 A1 * | 9/2005 | Yamasaki et al. | ............. 713/183 |
| 2005/0251856 A1 | 11/2005 | Araujo et al. | |
| 2006/0288404 A1 * | 12/2006 | Kirshnan et al. | ............. 726/5 |
| 2007/0021093 A1 | 1/2007 | Chu | |
| 2007/0027929 A1 | 2/2007 | Whelan | |
| 2008/0235746 A1 * | 9/2008 | Peters et al. | ............. 725/111 |

OTHER PUBLICATIONS

W. Richard Stevens, Stephen A. Rago; Advanced Programming in the UNIX® Environment: Second Edition, Pub Date: Jun. 17, 2005, Publisher: Addison Wesley Professional, ISBN: 0201433079, 40 Pages; chapter 17.*

W. Richard Stevens, Stephen A. Rago; Advanced Programming in the UNIX® Environment: Second Edition, Pub Date: Jun. 17, 2005, Publisher: Addison Wesley Professional, ISBN: 0201433079, pp. 1-1358.*

\* cited by examiner

*Primary Examiner* — Carl Colin
*Assistant Examiner* — Harunur Rashid (57) ABSTRACT

A computer system comprises a server that serves a plurality of clients and performs client authentication and authorization during client login to the server using file system permissions specified for domain sockets. The server creates a domain socket file for individual users during initialization which sets permissions enabling user access to the domain socket file, monitors file descriptors for received connection requests from client processes, and either opens a requesting client process with permission-enabled user access or denies access to an unauthorized client process.

13 Claims, 8 Drawing Sheets

SERVER FOR AUTHENTICATING CLIENTS USING FILE SYSTEM PERMISSIONS

BACKGROUND

Many software applications are designed to operate according to a client-server paradigm in which a client logs onto a system and executes commands that communicate with a server process on the same system. The client command sends requests to the server process, causing the server process to appropriately respond to handle the request. Often, the server process is called upon to handle requests from clients with different privilege levels. For an appropriate response, the server process is to identify and authenticate the identity of the user executing the client command and then authorize that client to perform particular operations.

SUMMARY

An embodiment of a computer system comprises a server that serves a plurality of clients and performs client authentication and authorization during client login to the server enabled by file system permissions of User Domain Sockets (UDS).

BRIEF DESCRIPTION OF THE DRAWINGS

Embodiments of the invention relating to both structure and method of operation may best be understood by referring to the following description and accompanying drawings.

DETAILED DESCRIPTION

An illustrative computer or network system and corresponding operating method enable client process authentication and authorization using file system permissions.

In more particular embodiments, the depicted structures and techniques facilitate client authentication and authorization of local clients using file system permissions of UDS sockets.

Various techniques can be used to perform authentication and authorization. For example, an application password can be issued for each user role. A client command, upon execution, prompts a user for a predetermined password and sends the password in combination with a username into the server process during a request. The server process looks up the user in a database of users and verifies that the correct password was sent. A drawback is that the user has to supply two passwords to enable application usage—one password to login to the system and another to access the application. Furthermore, a malicious user on the system that is denied access to the application can launch a Denial of Service (DoS) attack on the application by constantly executing a client command, causing the server process to unproductively waste time by attempting authentication while superseding the servicing of authorized requests from legitimate users.

To accommodate authorization and authentication, the server process can use some type of socket connection to enable receipt of the client requests at the server. Some techniques can use a well-known port or a port broker to form the socket connection. However, if the server process only accepts connections from local clients, a User Domain Socket (UDS) can be used. A UDS is a socket that behaves in many ways as a simple file, for example having a filename that exists in the file system. A server process can open and read from the UDS. A client process can open and write to the UDS so that the written data can be received by the server process. In the manner of any file in a file system, the UDS has permissions bits that identify which client processes can write to the UDS.

Typically a system that uses the UDS may only allow root users to access the application using the permissions bits so that allowing non-root users to access the application would entail setting of permissions on the UDS such that any user could have access. Thus once a client establishes a UDS connection to the server, the server could use a standard authentication mechanisms such as user/password authentication to authenticate the user, a scheme having the disadvantage of susceptibility to DoS attacks by malicious local users that flood the UDS socket with invalid connection requests that force the server process to futilely waste time authenticating and denying invalid requests.

Figure 1:
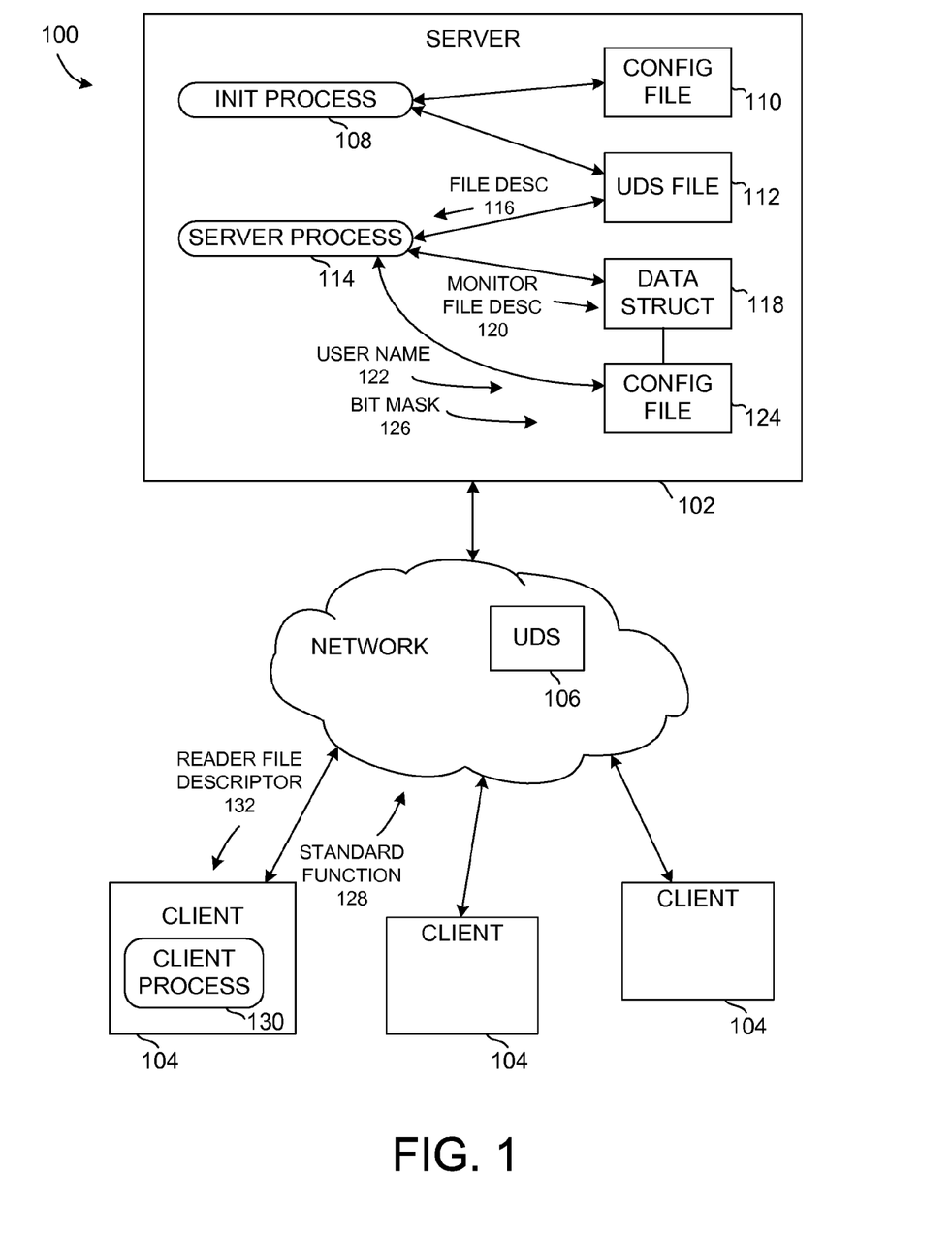
FIG. 1 is a schematic block diagram showing an embodiment of a computer system that performs client process authentication and authorization using file system permissions.

Referring to FIG. 1, a schematic block diagram illustrates an embodiment of a computer system 100 that performs client process authentication and authorization using file system permissions. The illustrative computer system 100 comprises a server 102 that serves multiple clients 104 and performs client authentication and authorization during client login to the server 102 which is enabled by file system permissions of User Domain Sockets (UDS) 106.

The server 102 receives a request from a client 104 and identifies authorization of a client 104 based on determination of a connection upon which a request is received.

In an illustrative embodiment, the server 102 can execute a server initialization process 108 that reads a configuration file 110 to determine which users are authorized, creates a User Domain Socket (UDS) file 112 for the individual users, and sets ownership and permissions enabling only the authorized user access to the UDS file 112.

The server 102 can also execute a server process 114 that opens the User Domain Socket (UDS) file 112 to obtain a file descriptor 116 and creates a data structure 118 for the UDS file 112 including a monitoring file descriptor 120. The server process 114 also sets the monitoring file descriptor 120 equal to the UDS file descriptor 116 and sets a user name 122 to identify a user in a corresponding configuration file 124, and encodes capabilities identified in the configuration file 124 into a capability bit mask 126.

The server process 114 can also poll monitoring file descriptors 120 for incoming connection requests from client processes 130.

The computer system 100 can also comprise a client 104 that is communicatively coupled to the server 102 for service by the server 102. The client 104 can execute a client process 130 that executes on the client 104 and calls a standard function 128 to obtain a user name 122 and receives the user name 122. The client process 130 uses the received user name 122 to construct a filename for a User Domain Socket (UDS) file 112 which is targeted for connection by the client 104 and attempts to open a connection to the server process 114 via the UDS file 112.

The server process 114 can deny access to an unauthorized client process because no corresponding User Domain Socket (UDS) file exists for the attempt to open the connection.

In some embodiments, the server process 114 polls monitoring file descriptors 120 for incoming connection requests from client processes 130 and responds to an authorized connection opened by a client process 130. The server process 114 can open the client process 130 by activating to an operational state, reading a message from the User Domain Socket (UDS) 106, and popping a file descriptor 116 associated with a corresponding User Domain Socket (UDS) file 112.

The server process 114 can use the monitoring file descriptors 120 to determine a reader file descriptor 132 for a client connection via an accept function call, adds the reader file descriptor 132 to a list of reader file descriptors allocated to a user, and uses a capability mask 126 associated with the user to determine request authorization.

In some configurations, a server process 114 can be implemented that sets a threshold for a number of concurrently enabled reader file descriptors 132 at server process startup, increments a counter when a new reader file descriptor is accepted from a monitoring file descriptor 120, and decrements the counter when a reader file descriptor is closed. The server process 114 can determine whether the monitoring file descriptor 120 pops when the counter is at threshold and, if so, rejects the new reader file descriptor request and adds the rejected new reader file descriptor request to a list of pending monitoring file descriptors 120.

The illustrative computer system 100 and associated technique improve performance in various ways. For example, the server process 114 does not have to maintain a database of users and associated passwords to authenticate and authorize client requests but can instead rely on previous authentication during client login and can determine the client authorization based on the connection upon which the request is received.

Furthermore, the depicted computer system 100 and operating method is not susceptible to DoS attacks by local malicious users. For a user with no intended access to the application, file system permissions on the UDS files prevent even an ability to send a message to the server process. Therefore, the server process is not burdened by any actions in authenticating and denying requests.

Figure 2:
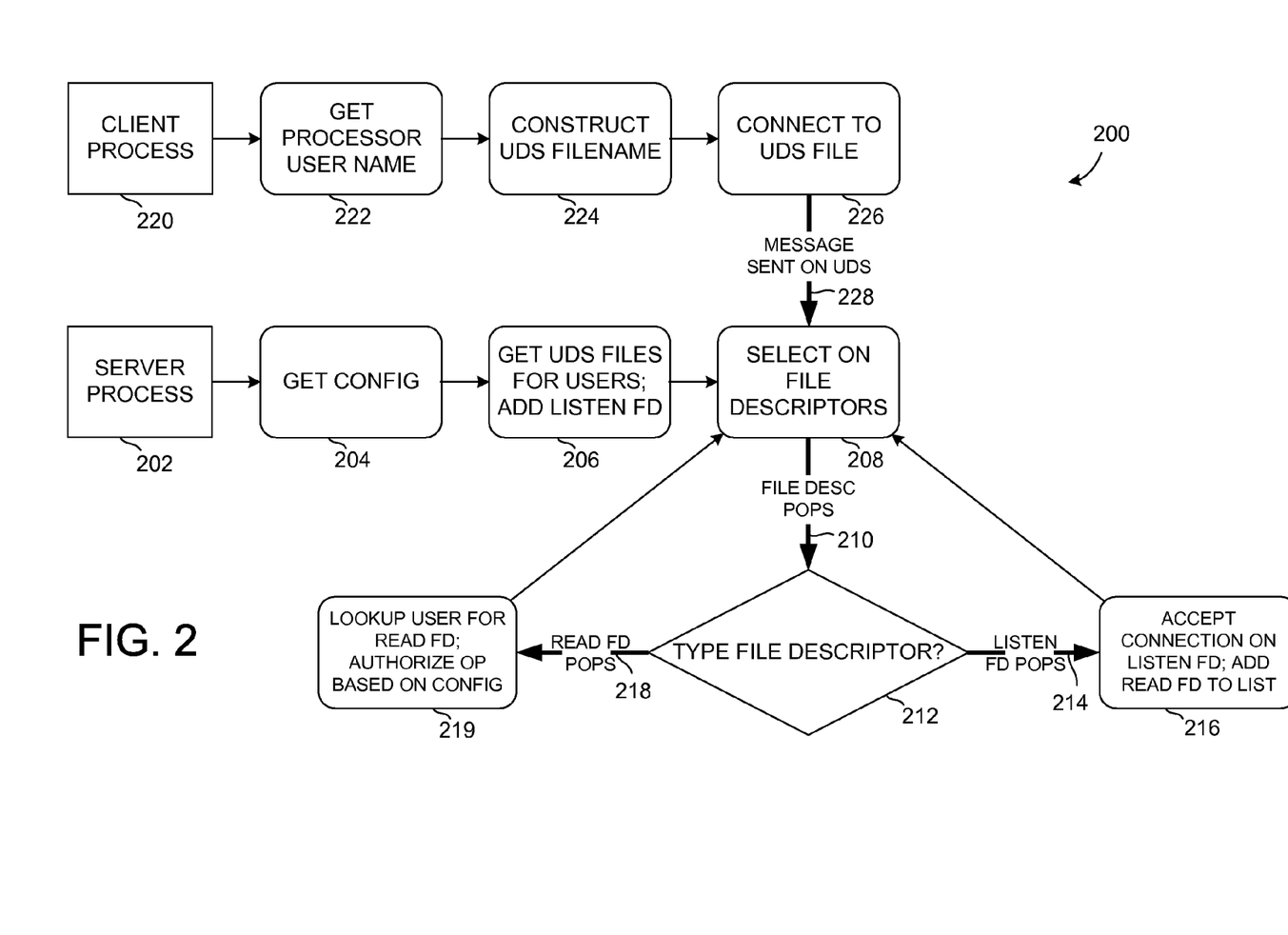
FIG. 2 is a flow chart depicting an example of construction and operation of a computer system implementing client process authentication and authorization using file system permissions.

Referring to FIG. 2, a flow chart depicts an example of construction and operation of a computer system 200 implementing client process authentication and authorization using file system permissions. One aspect of the illustrative technique is configuration of user roles. A computer system 200 implementing authentication and authorization can have a configuration file that is only modifiable by a root user on the system. An example configuration is as follows:

admin: modify, start, stop, view
operator: start, stop, view
jsmith: view.

A server process 202 first obtains a configuration 204. The example configuration indicates that the user admin has modify, start, stop, and view capabilities. The user operator has start, stop, and view capabilities. User jsmith has only view capabilities. Once the configuration file is in place 204 at a predetermined location, the server process 202 can begin executing. As part of the server process initialization, the configuration file determines which users are authorized and a UDS file is created 206 for each user and set ownership and permissions such that only user and the root user have access to the file. A root-only UDS file is also created that is only accessible by the root user as the default configured user. Accordingly, the UDS file listing can have the form:

```
srw-----   1 root      root   0 Oct 24 10:09 .myapp.root.socket
srw-----   1 admin     root   0 Oct 24 10:09 .myapp.admin.socket
srw-----   1 operator  root   0 Oct 24 10:09 .myapp.operator.socket
srw-----   1 jsmith    root   0 Oct 24 10:09 .myapp.jsmith.socket.
```

After creating 206 the UDS files, the server process opens each file to obtain 208 a corresponding "listen file descriptor" and creates a data structure for each file that can have a form as follows:

```
struct uds {
    int    listen_fd;
    char   *user_name;
    int    capability_mask;
};
```

Parameter listen_fd is set to the file descriptor that is obtained upon opening the corresponding UDS file. Parameter user_name is set to the corresponding user in the configuration file (admin, operator, or jsmith) and corresponding capabilities (modify, start, stop, view) are encoded into a bit mask that is set for the capability_mask.

After initialization, the server process 202 polls the listen file descriptors, for example using a call to a select system intrinsic, for incoming connection requests from client processes 220.

A client process 220 upon initialization or startup calls a standard function to obtain 222 a user name identifying the client process 220. A client process 220 that is run by a user logged in as root is allocated "root" capabilities. Similarly, a client process 220 that is run by a user logged in as admin, is allocated "admin" capabilities. Using the returned user name, the client process 220 constructs 224 a filename for the UDS file that is to be connected to the client process 220. In the illustrative example, the filename can be ".myapp.admin-.socket". The client process 220 then attempts to open 226 a connection to the server process 202 via the constructed UDS file. Note that if the user is not authorized to "talk" to the server process 202, then no UDS file exists for that user and when the client process 220 attempts to open the UDS file, an appropriate error message is returned that can be interpreted as an "Access Denied" notification. Also note that for a "malicious" user attempting to write an illegitimate program that opens any of the UDS files, the open fails due to lack of file system permissions to open the UDS files. The depicted UDS file shows that read and write access are only granted to the owner of the file.

FIG. 2 illustrates flow of the technique. Once a legitimate connection is opened 226 by a client process 220 to the server process 202, the file descriptor associated with the UDS file on the server side will "pop" 210 as the server process 202 polling all file descriptors is awakened and the message is read off the socket. The server process 202 can then simply look up 212 the listen file descriptor that popped 210 in an associated list of file descriptors and determine which user is sending the request. The listen file descriptor 214 supplies the server process 202 with a read file descriptor for the client connection via an accept function call. The read file descriptor for the accept connection on the listen file descriptor is added 216 to a list of read file descriptors for the user. When requests are received 218 on the read file descriptor, the server process 202 can use the capability mask associated with the user to determine 219 whether the request is authorized and respond accordingly. Thus, in the example, if user jsmith sends a request to do anything other than "view" then the request is denied by the server process 202. The server process 202 looks up 219 the user associated with the read file descriptor and authorizes the operation based on the configuration.

Another feature of the depicted system 200 can be implementation of a threshold for the number of concurrent reader file descriptors the server process 202 will allow. The server process 202 upon initialization can set the threshold.

When a new reader file descriptor is accepted from a listen file descriptor, a counter is incremented. When a reader file descriptor is closed, the counter is decremented. If the listen file descriptor pops and the value of the counter is already at the threshold, the new reader is not accepted, but instead the listen file descriptor is added to a list of pending listen file descriptors. Once one of the existing reader file descriptors is closed, the server process 202 can accept a new reader file descriptor from one of the pending listen file descriptors. Accordingly, the server process 202 can maintain the number of file descriptors in a select loop at a reasonable size for service capabilities of the server process 202. The threshold can be implemented for all users or can be implemented on a user basis, enabling a different number of concurrent clients for each user.

Figure 3A:
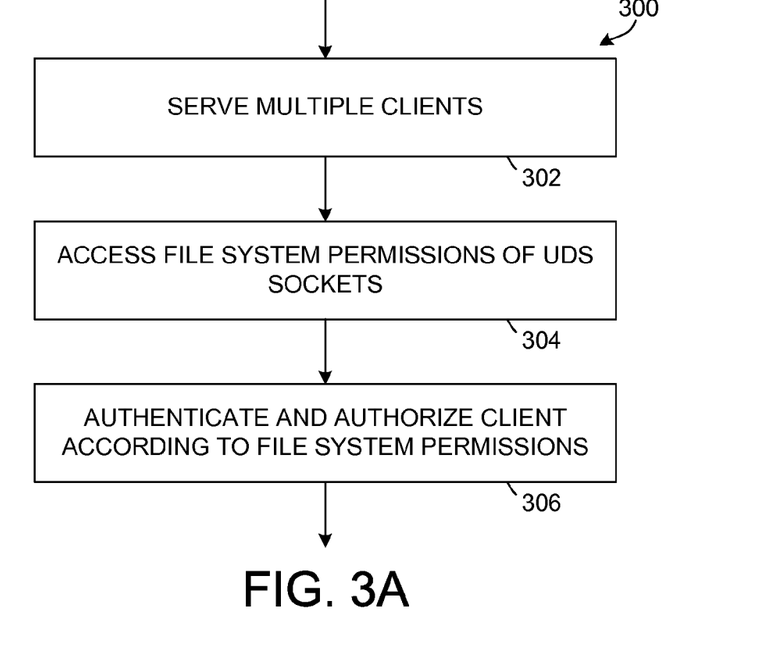
FIGS. 3A through 3G are flow charts illustrating one or more embodiments or aspects of a method of authenticating and authorizing client processes for a computer system.

Referring to FIGS. 3A through 3G, flow charts illustrate one or more embodiments or aspects of a method of authenticating and authorizing client processes for a computer system. As shown in FIG. 3A, the method 300 for operating a computer system comprises serving 302 multiple clients and accessing 304 file system permissions of User Domain Sockets (UDS). During client login to a server, a client is authenticated and authorized 306 according to the file system permissions.

Figure 3B:
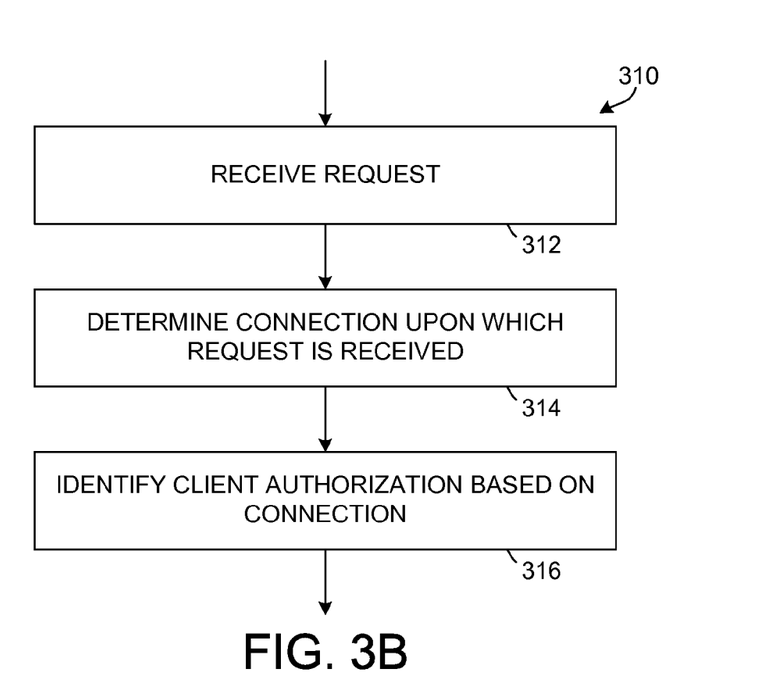

In an example implementation depicted in FIG. 3B, a server can perform client authentication and authorization. A method 310 can comprise receiving 312 a request and determining 314 the connection upon which the request is received. Authorization of a client is identified 316 based on the connection determination.

Figure 3C:
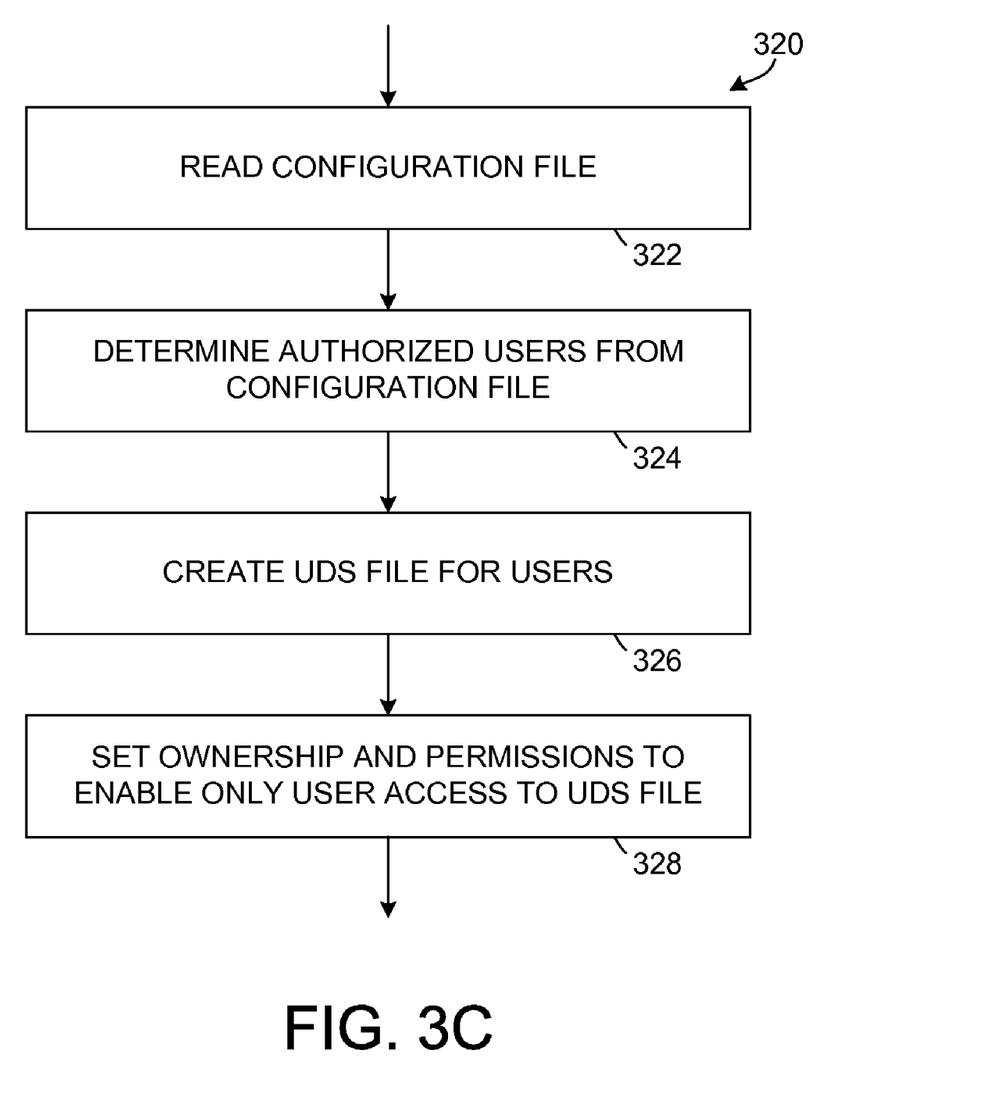

In a further server action shown in FIG. 3C, a method 320 can comprise reading 322 a configuration file and determining 324 which users are authorized from the configuration file. A User Domain Socket (UDS) file is created 326 for the individual users and ownership and permissions are set 328 to enable only user access to the UDS file.

Figure 3D:
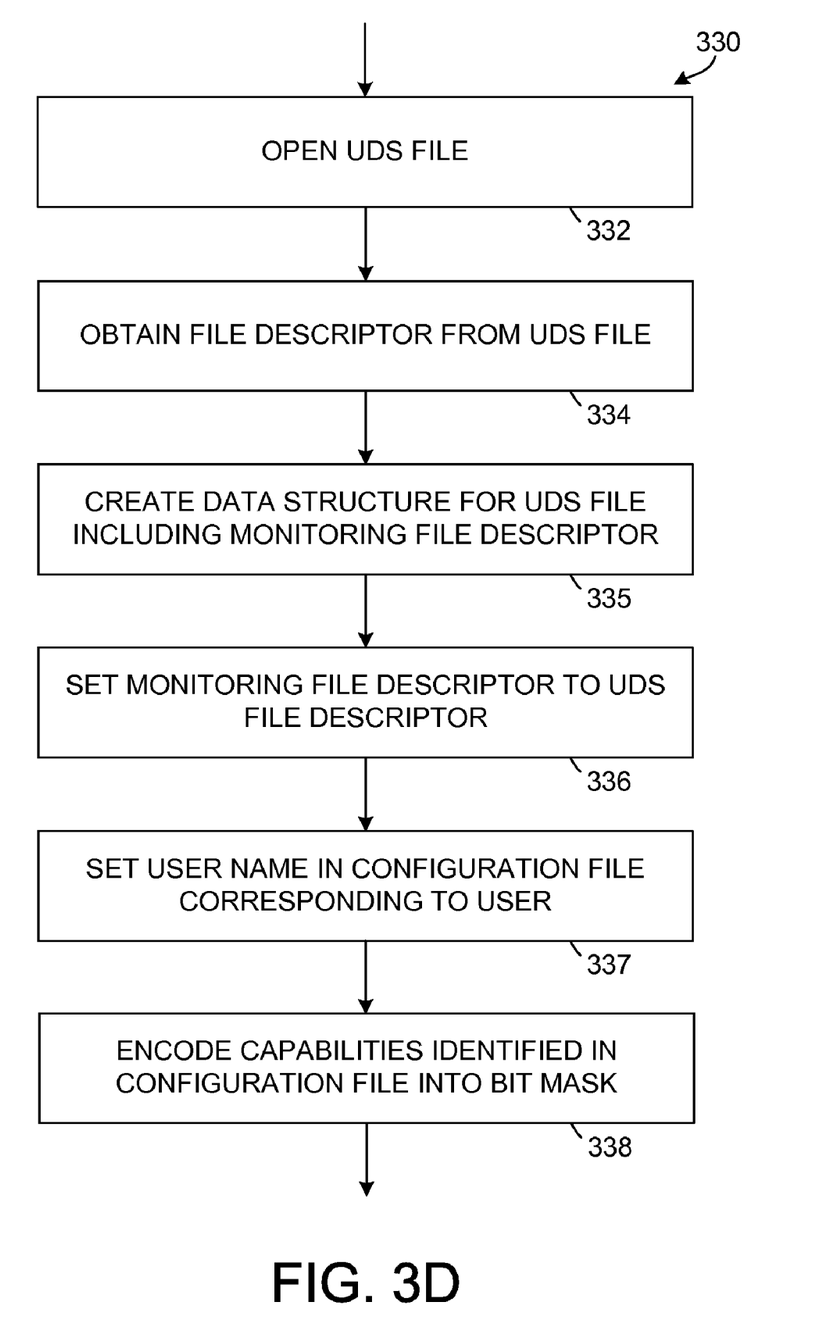

As shown in FIG. 3D, a logic such as a logic that executes in a server can perform a method 330 comprising opening 332 a User Domain Socket (UDS) file and obtaining 334 a file descriptor from the UDS file. A data structure for the UDS file is created 335 including a monitoring file descriptor. The monitoring file descriptor is set 336 to the UDS file descriptor and a user name is set 337 to a user in a corresponding configuration file. Capabilities identified in the configuration file are encoded 338 into a capability bit mask.

In a typical implementation, monitoring file descriptors can be polled 239 for incoming connection requests from client processes.

Figure 3E:
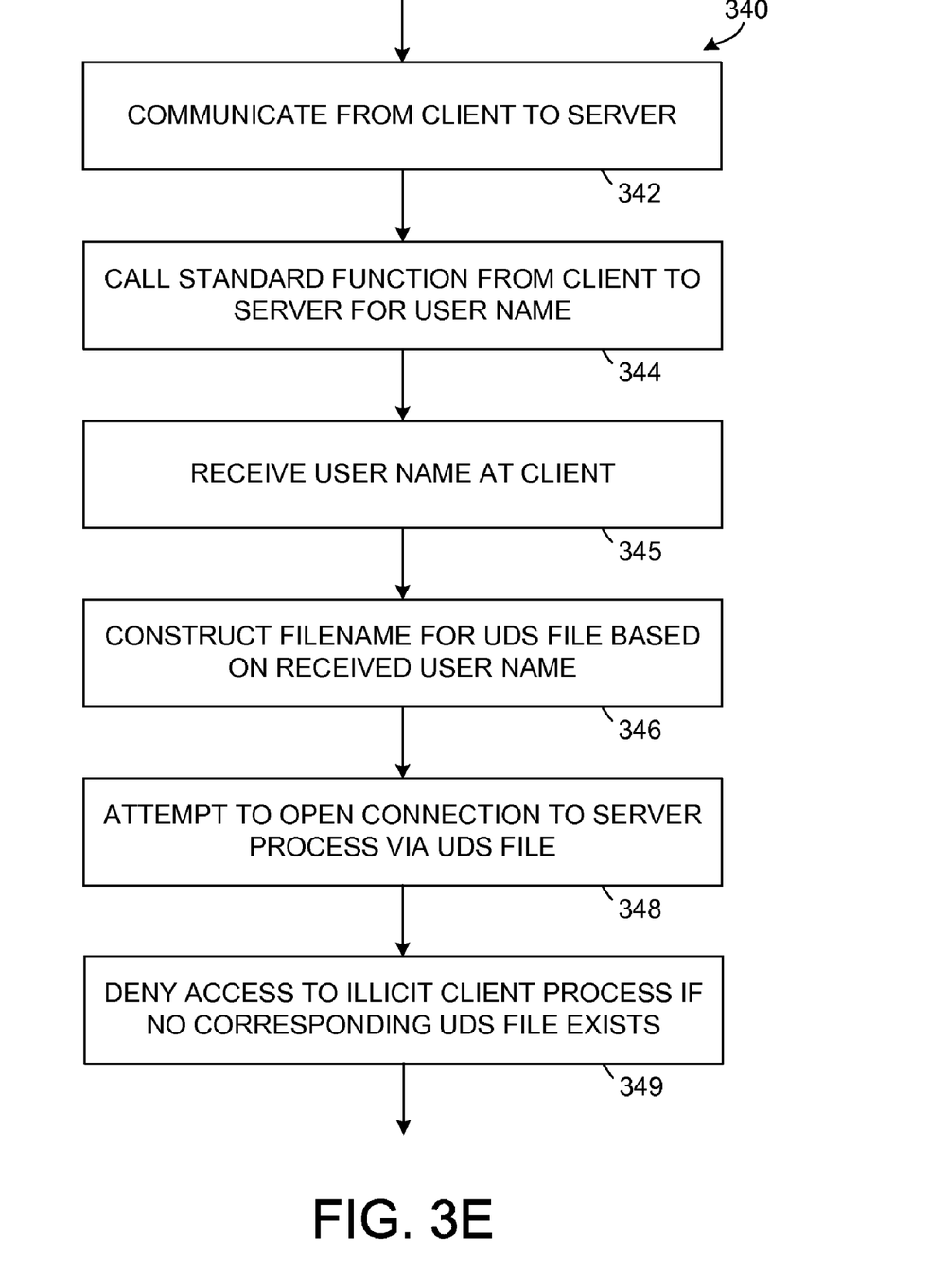

Referring to FIG. 3E, a flow chart illustrates actions of a method 340 including server-client interactions. The method 340 proceeds by communicating 342 from a client to a server and calling 344 a standard function from the client directed to the server to obtain a user name. The client receives 345 the user name and constructs 346 from the received user name a filename for a User Domain Socket (UDS) file which is targeted for connection by the client. Attempts 348 to open a connection to a server process through usage of the UDS file. The server can deny access 349 to an unauthorized client process when no corresponding User Domain Socket (UDS) file exists for the attempt to open the connection.

Figure 3F:
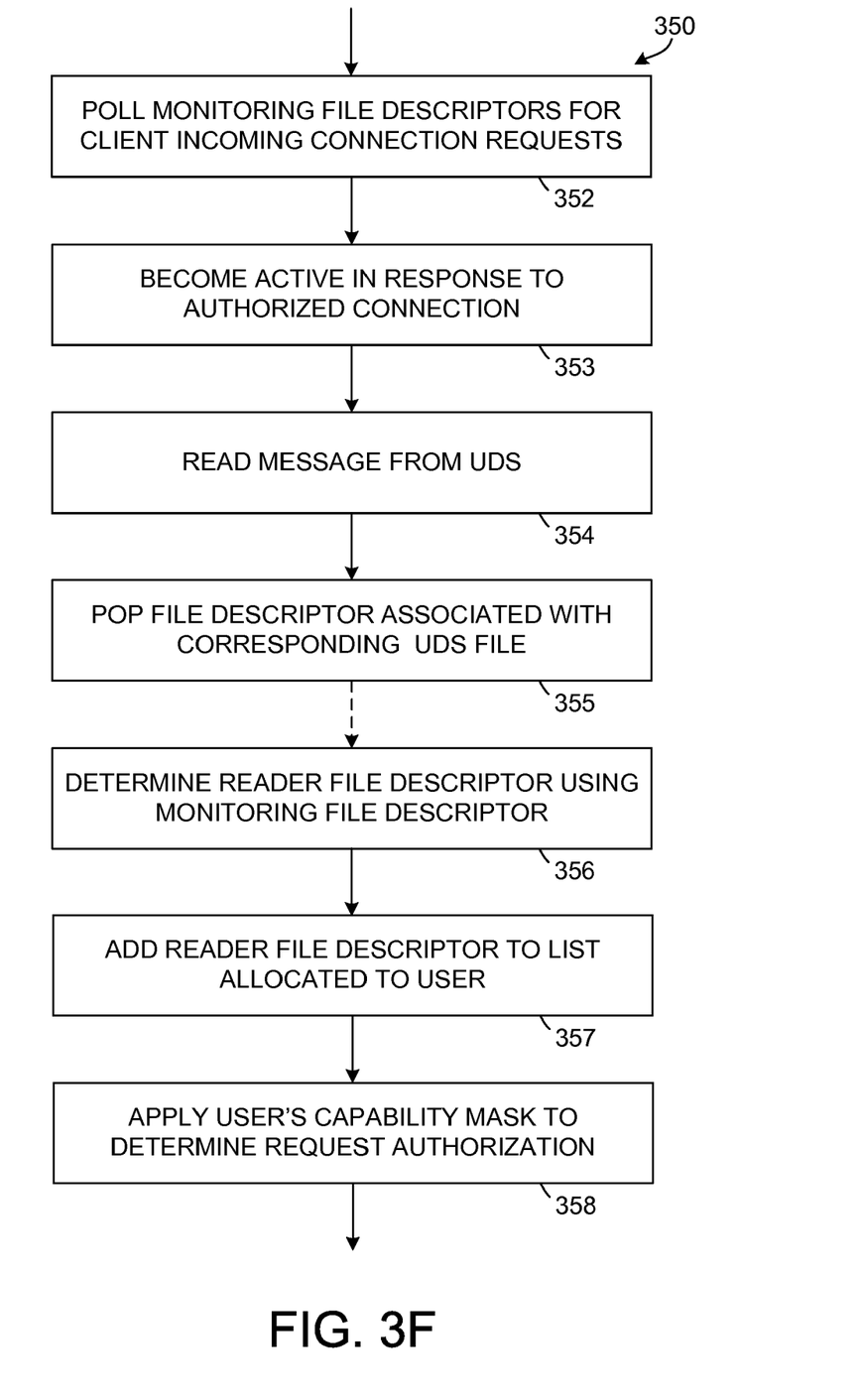

Referring to FIG. 3F, a flow chart illustrates a method 350 including actions of a server in response to a client request. The method 350 comprises polling 352 monitoring file descriptors for incoming connection requests from client processes and activating 353 in response to an authorized connection opened by the client process. The server can activate 353, for example, by reading 354 a message from the User Domain Socket (UDS) and popping 355 a file descriptor associated with a corresponding User Domain Socket (UDS) file.

In some implementations, the method 350 can further comprise using 356 the monitoring file descriptors to determine a reader file descriptor for a client connection via an accept function call and adding 357 the reader file descriptor to a list of reader file descriptors allocated to a user. A capability mask associated with the user can be applied 358 to determine request authorization.

Figure 3G:
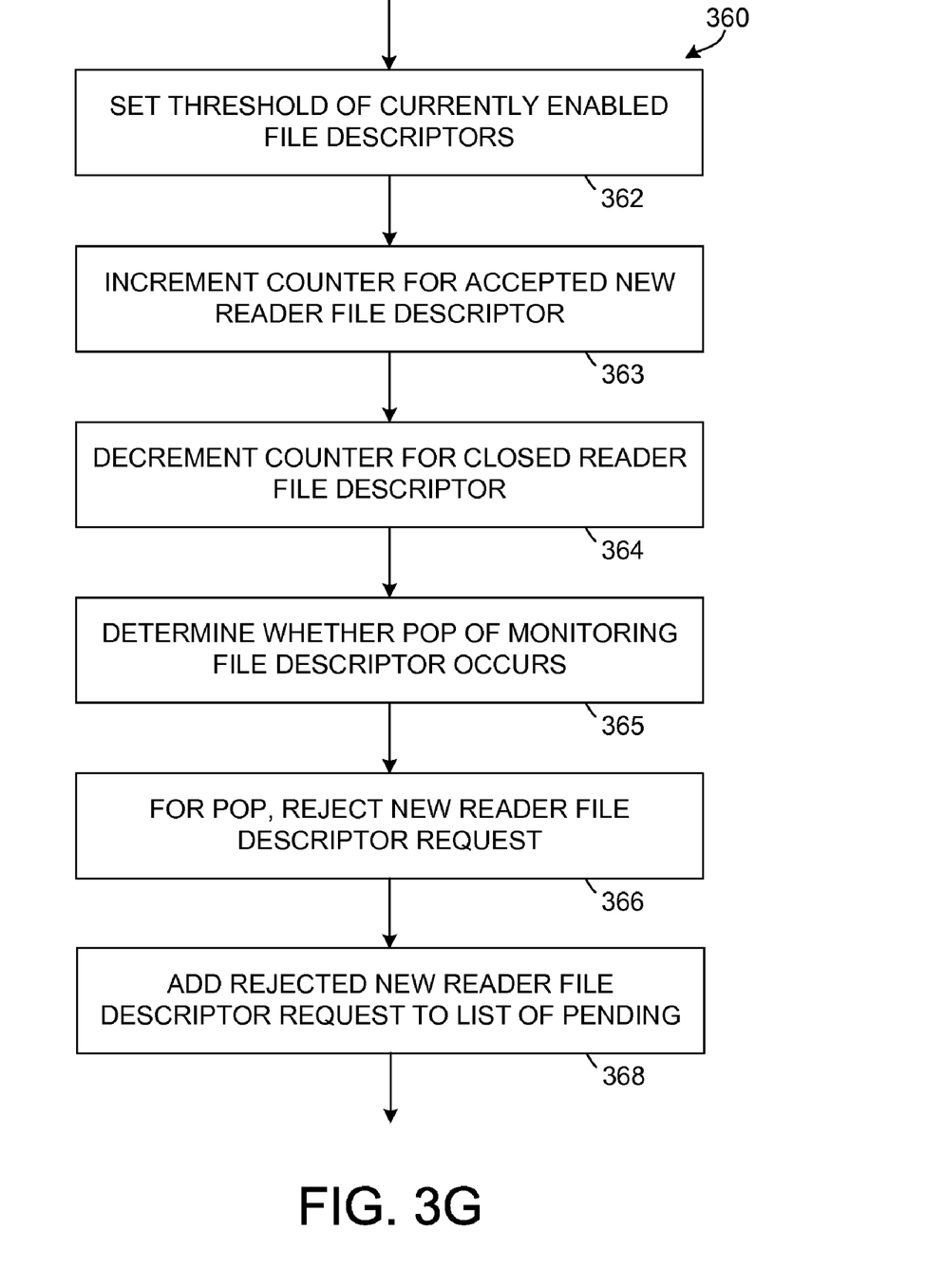

Referring to FIG. 3G, a flow chart shows a method 360 for setting a threshold for the number of concurrent reader file descriptors allowed by a server process. The illustrative method 360 comprises initializing or setting 362 a threshold for a number of concurrently enabled reader file descriptors. A counter can be incremented 363 when a new reader file descriptor is accepted from a monitoring file descriptor and decremented 364 when a reader file descriptor is closed. Whether the monitoring file descriptor pops when the counter is at threshold is determined 365 and, if so, the new reader file descriptor request is rejected 366 with the rejected new reader file descriptor request added 368 to a list of pending monitoring file descriptors.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method comprising:
a server process running on a computer system receiving user requests from users via respective user-domain-socket files having respective different socket identities;
said server process determining respective privilege levels for said users as a function of said socket identities;
said server process responding to each of said user requests in accordance with the privilege level determined for the user issuing the request; and
setting ownership and permissions to enable only a respective user to access a respective user-domain-socket file.

2. A method as recited in claim 1 further comprising:
client processes providing for authentication of said users; and
said client processes writing user requests to respective user-domain-socket files for respective authenticated ones of said users using respective file system permissions associated with said user-domain-socket files.

3. A method as recited in claim 2 further comprising:
prior to said receiving, an initialization process reading a configuration file having authorization data associating user names of authorized users and their respective privilege levels; and
said initialization process, using said authorization data, creating respective ones of said user-domain-socket files for each of said authorized users.

4. A method as recited in claim 2 wherein:
said server process sets a threshold number of requests from all users that it can handle concurrently; and
said server process rejects requests that would cause a number of requests to exceed said threshold.

5. A method as recited in claim 4 further comprising: placing file descriptors for rejected requests in a list of pending monitored file descriptors.

6. A computer system comprising:
non-transitory computer-readable storage media encoded with user-domain-socket files, said user-domain-socket files having respective system file permissions for determining which users can write respective user requests to which user-domain-socket files, each of said users having an associated privilege level; and
one or more processors for,
executing a server process so that said server process responds to requests received via respective ones of said user-domain-socket files in accordance with the respective privilege levels for the respective users, and
for setting ownership and permissions to enable only a respective user to access a respective user-domain-socket file.

7. A computer system as recited in claim 6 wherein said one or more processors provide for executing an initialization process so as to:
read a configuration file having authorization data associating user names of authorized users and their respective privilege levels; and
create, using said authorization data, respective ones of said user-domain-socket files for each of said authorized users.

8. A system comprising non-transitory computer-readable storage media encoded with software that, when executed by one or more computer processors, provides for:
a server process running on a computer system receiving user requests from respective users via respective user-domain-socket files having respective different socket identities;
said server process determining respective privilege levels for said users as a function of said socket identities;
said server process responding to said user requests in accordance with the respective privilege levels associated with the respective users issuing said requests; and
setting ownership and permissions to enable only a respective user to access a respective user-domain-socket file.

9. A system as recited in claim 8 further comprising said one or more processors.

10. A system as recited in claim 8 wherein said software further provides for:
client processes providing for authentication of said users; and
said client processes writing user requests to respective user-domain-socket files for respective authenticated ones of said users using respective file system permissions associated with said user-domain-socket files.

11. A system as recited in claim 10 wherein said software further provides for:
prior to said receiving, an initialization process reading a configuration file having authorization data associating user names of authorized users and their respective privilege levels; and
said initialization process, using said authorization data, creating respective ones of said user-domain-socket files for each of said authorized users.

12. A system as recited in claim 10 wherein said software further provides for:
setting a threshold number of requests from all users that it can handle concurrently; and
rejecting requests that would cause said number of requests to exceed said threshold.

13. A system as recited in claim 12 wherein said software further provides for said server process placing file descriptors for rejected requests in a list of pending monitored file descriptors.

* * * * *